United States Patent
Miller et al.

(10) Patent No.: US 11,511,800 B2
(45) Date of Patent: Nov. 29, 2022

(54) DETERMINING AN ANGLE OF A MOVEMENT PATH OF A TRAILER

(71) Applicant: Robert Bosch GmbH, Stuttgart (DE)

(72) Inventors: James Stephen Miller, Dexter, MI (US); Greg Sypitkowski, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 16/957,779

(22) PCT Filed: Dec. 21, 2018

(86) PCT No.: PCT/US2018/067346
§ 371 (c)(1),
(2) Date: Jun. 25, 2020

(87) PCT Pub. No.: WO2019/133537
PCT Pub. Date: Jul. 4, 2019

(65) Prior Publication Data
US 2021/0061353 A1   Mar. 4, 2021

Related U.S. Application Data

(60) Provisional application No. 62/610,747, filed on Dec. 27, 2017.

(51) Int. Cl.
*B62D 13/06*   (2006.01)
*B60D 1/62*   (2006.01)
(Continued)

(52) U.S. Cl.
CPC ............... *B62D 13/06* (2013.01); *B60D 1/62* (2013.01); *G01B 11/275* (2013.01); *G06V 20/56* (2022.01); *B60R 2300/105* (2013.01)

(58) Field of Classification Search
CPC ... B60R 2300/105; G01B 11/275; B60D 1/62; G06V 20/56; B62D 13/06
(Continued)

(56) References Cited

U.S. PATENT DOCUMENTS 9,085,261 B2   7/2015   Lu et al.
9,566,911 B2   2/2017   Greenwood et al.
(Continued)

FOREIGN PATENT DOCUMENTS

DE   102008045436 A1   3/2010
DE   102010008324 A1   8/2011
(Continued)

OTHER PUBLICATIONS

International Search Report and Written Opinion for Application No. PCT/US2018/067346 dated May 7, 2019 (15 pages).

*Primary Examiner* — On S Mung
(74) *Attorney, Agent, or Firm* — Michael Best & Friedrich LLP

(57) ABSTRACT

Systems and methods for determining an angle of a movement path of a trailer. The system for determining an angle of a movement path of a trailer comprises a camera; and an electronic controller communicatively coupled to the camera and configured to receive first data from the camera, determine an absolute angle of the trailer based on matching one portion of an image received in the first data to a template, receive second data from the camera, estimate a change in the angle of the trailer based on tracking one or more points on the trailer received in the second data, and determine the angle of the movement path of the trailer based upon the trailer angle and the change in the angle of the trailer.

14 Claims, 3 Drawing Sheets

(51) Int. Cl.
  *G01B 11/275* (2006.01)
  *G06V 20/56* (2022.01)
(58) Field of Classification Search
  USPC .......................................................... 701/41
  See application file for complete search history.

(56) References Cited

U.S. PATENT DOCUMENTS

| | | |
|---|---|---|
| 9,610,975 B1 | 4/2017 | Hu et al. |
| 9,783,230 B2 | 10/2017 | Hafner |
| 9,796,228 B2 | 10/2017 | Hu et al. |
| 9,836,060 B2 | 12/2017 | Ghneim et al. |
| 2006/0244579 A1 | 11/2006 | Raab |
| 2008/0231701 A1 | 9/2008 | Greenwood et al. |
| 2009/0005932 A1 | 1/2009 | Lee et al. |
| 2015/0217693 A1 | 8/2015 | Pliefke et al. |
| 2015/0344067 A1 | 12/2015 | Lavoie et al. |
| 2017/0050672 A1 | 2/2017 | Gieseke et al. |
| 2017/0073005 A1 | 3/2017 | Ghneim et al. |
| 2017/0123431 A1* | 5/2017 | Ghneim .................. G06V 20/56 |
| 2017/0174022 A1 | 6/2017 | Hu et al. |
| 2017/0174023 A1 | 6/2017 | Hu et al. |
| 2017/0174130 A1 | 6/2017 | Hu et al. |
| 2017/0177949 A1 | 6/2017 | Hu et al. |
| 2017/0177973 A1* | 6/2017 | Hu ............................ G06T 7/13 |

FOREIGN PATENT DOCUMENTS

| | | |
|---|---|---|
| DE | 102011104256 A1 | 7/2012 |
| DE | 102011101990 B3 | 10/2012 |
| DE | 102011113191 A1 | 3/2013 |
| EP | 1593552 A1 | 11/2005 |
| GB | 2535789 A1 | 8/2016 |
| WO | 2008064892 A1 | 6/2008 |
| WO | 2016135312 A1 | 9/2016 |

* cited by examiner

DETERMINING AN ANGLE OF A MOVEMENT PATH OF A TRAILER

CROSS REFERENCE TO RELATED APPLICATIONS

This application claims priority to U.S. Provisional Patent Application No. 62/610,747, filed Dec. 27, 2017, the content of which is incorporated by reference in its entirety.

FIELD

Embodiments relate to a system and methods for determining an angle of a movement path of a trailer.

BACKGROUND

Operating a vehicle with an attached trailer involves making difficult maneuvers, especially when operating the vehicle and attached trailer in reverse. Being able to determine an angle of a movement path of the trailer while in reverse enables an automated system to control the vehicle during maneuvers or enables an operator of the vehicle to execute difficult maneuvers in a more skillful manner.

SUMMARY

One embodiment of the invention provides a system for determining an angle of a movement path of a trailer. In one instance, the system includes a camera and an electronic controller communicatively coupled to the camera. The electronic controller is configured to receive first data from the camera, determine an absolute angle of the trailer based on matching one portion of an image received in the first data to a template, receive second data from the camera, estimate a change in the angle of the trailer based on tracking one or more points on the trailer received in the second data, and determine the angle of the movement path of the trailer based upon the trailer angle and the change in the angle of the trailer.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable media, one or more input/output interfaces, one or more application specific integrated circuits (ASICs), and various connections (for example, a system bus) connecting the various components.

Figure 1:
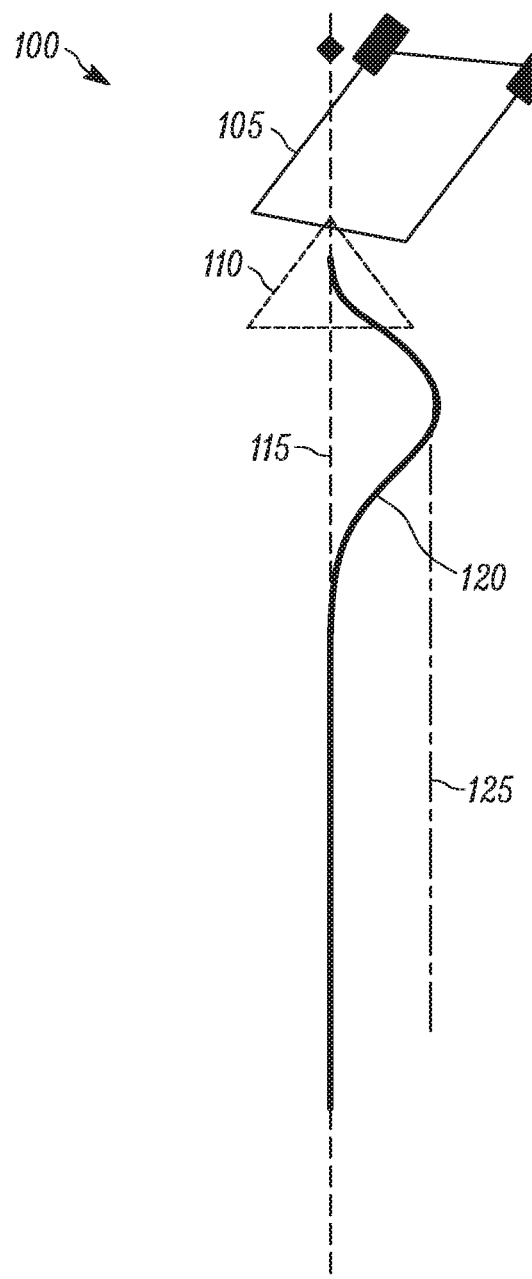
FIG. 1 is an illustration of a maneuver of a vehicle and a trailer according to one embodiment.

FIG. 1 illustrates a maneuver 100 of a vehicle 105 having an attached trailer 110. The maneuver 100 may cause the vehicle 105 and trailer 110 to follow one or more paths, such as a desired path 115, an optimal path 120, and a typical path 125.

The desired path 115 is a path that an operator of the vehicle 105 desires the vehicle 105 and the trailer 110 to move along. The desired path 115 is based on steering, braking, and throttle (or acceleration) inputs made by the operator of the vehicle 105. The desired path is achieved assuming ideal conditions and a perfect response to the operator inputs.

However, maneuvering along the desired path 115 is difficult to do, especially if the vehicle 105 starts at an angle that is not a perfectly straight angle respective to the trailer 110. Under such circumstances, the operator of the vehicle 105 may have to correct for the trailer 110 with steering inputs. For example, in order for both the vehicle 105 and the trailer 110 to follow the desired path 115, the operator of the vehicle 105 may initially have to follow the optimal path 120, which corrects for the vehicle 105 starting at an angle relative to the trailer 110. Both the vehicle 105 and the trailer 110 follow the optimal path 120 until both the vehicle 105 and the trailer 110 have straightened out and are following the desired path 115.

It is possible that the operator of the vehicle 105 makes imperfect inputs or a mistake in trying to follow the optimal path 120. Under such circumstances, the vehicle 105 follows the typical path 125. Since the typical path 125 is not the desired path 115, the trailer 110 may not end up in a location that the operator of the vehicle 105 desires.

To present information to an operator of the vehicle 105 and, in some instances, to provide information to an automated driving system (or semi-autonomous driving system) regarding the path of travel, a device or other mechanism for determining the angle of the movement path of the trailer 110 is needed.

Figure 2:
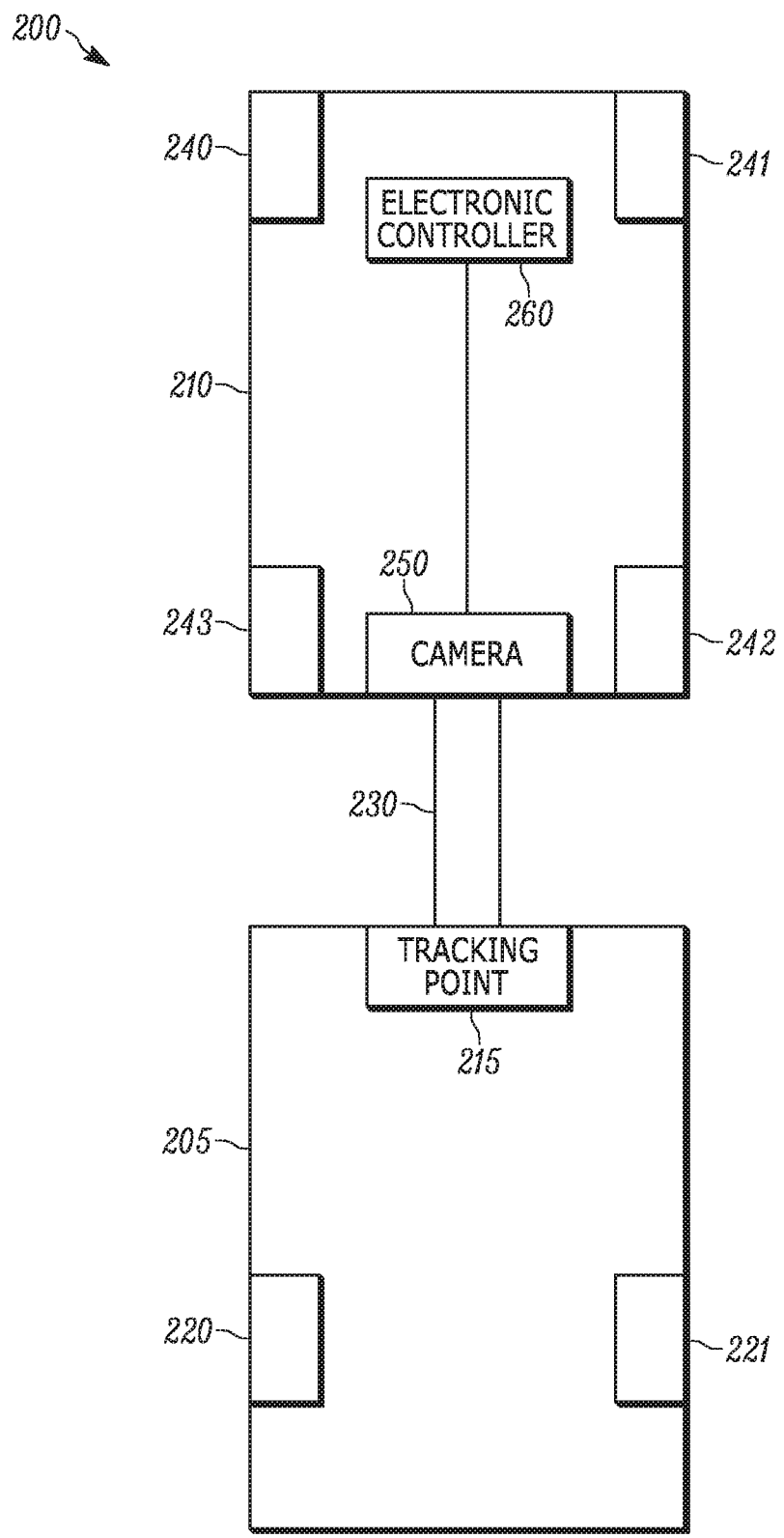
FIG. 2 illustrates a system for determining an angle of a movement path of a trailer according to one embodiment.

FIG. 2 illustrates a system 200 for determining an angle of a movement path of a trailer 205 which is coupled to a vehicle 210 according to one embodiment.

The trailer 205 includes a tracking point 215 and wheels 220 and 221. The tracking point 215 is a point on the trailer 215 that is tracked using a camera. The tracking point 215 is any portion of the trailer 205 with distinct visual features. In some embodiments, the tracking point 215 is the entire trailer 205. In some embodiments, there are a plurality of tracking points. The wheels 220 and 221, in some embodiments, may also be used as tracking points.

The trailer 205 is coupled to the vehicle 210 by coupler 230. The vehicle 210 includes wheels 240, 241, 242, and 243, a camera 250, and an electronic controller 260.

The camera 250 is communicatively coupled to the electronic controller 260 and is positioned to monitor a coupling point of the vehicle 210 and the coupler 230 and the tracking point 215 on the trailer 205. The camera 250 is configured to send first data of the coupling point of the vehicle 210 and coupler 230 back to the electronic controller 260. The camera 250 is further configured to send second data of the tracking point 215 back to the electronic controller 260. In some embodiments, the camera 250 includes an electronic processor that receives the first data of the coupling point of the vehicle 210 and the coupler 230 and the second data of the tracking point 215 then sends the first and second data to the electronic controller 260.

Figure 3:
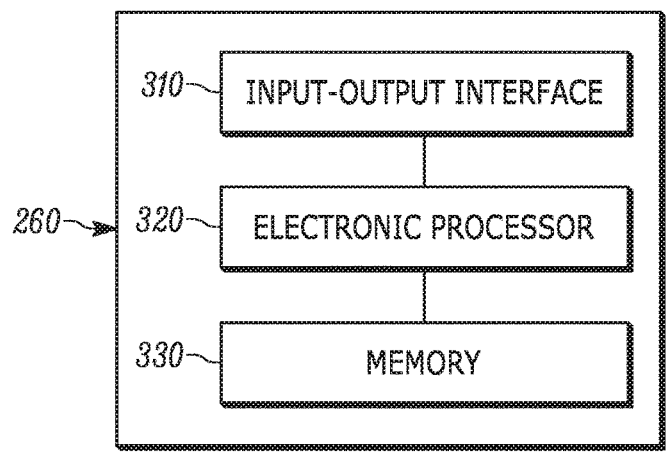
FIG. 3 illustrates an electronic controller according to one embodiment.

The electronic controller 260 is illustrated in FIG. 3 and includes an input-output interface 310, an electronic processor 320 (such as a programmable electronic microprocessor, microcontroller, and similar device), and a memory 330 (for example, non-transitory, machine-readable memory). The electronic processor 320 is communicatively coupled to the memory 330 and the input-output-interface 310. The electronic processor 320, in coordination with the memory 330 and the input-output interface 310, is configured to implement, among other things, the methods described herein.

It is to be understood that the electronic controller 260 may include a plurality of electrical and electronic components that provide power, operation control, and protection to the components and modules within the electronic controller 260 that are not described herein.

The electronic controller 260 may be implemented in several independent controllers (for example, programmable electronic control units) each configured to perform specific functions or sub-functions. Additionally, the electronic controller 260 may contain sub-modules that include additional electronic processors, memory, or application-specific integrated circuits (ASICs) for handling input/output functions, processing of signals, and application of the methods listed below. In other embodiments the electronic controller 260 includes additional, fewer, or different components.

Figure 4:
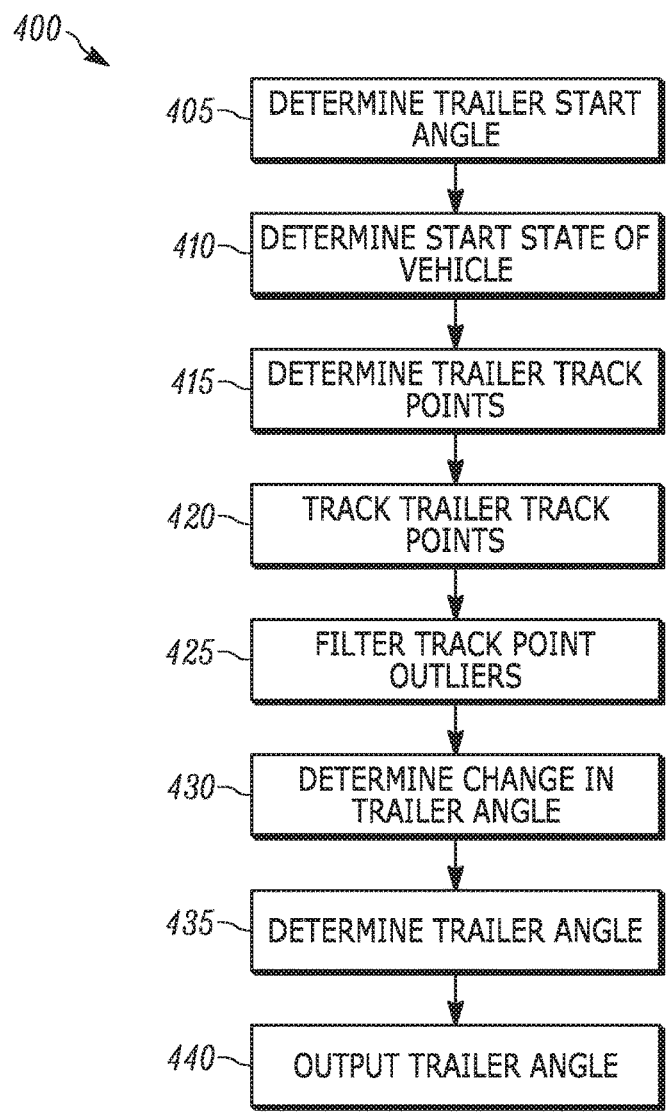
FIG. 4 is a flow chart that illustrates a method for determining an angle of a movement path of a trailer according to one embodiment.

An example method 400 for determining an angle of a movement path of a trailer is shown in a flow chart in FIG. 4. The method 400 includes determining a trailer start angle (at step 405). The camera 250 is positioned to monitor a coupling point of the coupler 230 and the vehicle 210 as discussed above. The camera 250 generates first data of the coupling point and sends the first data to the electronic controller 260. The electronic controller 260 is configured to receive the first data from the camera 250 and determine the trailer start angle by comparing the coupler 230 with the coupling point using a measurement algorithm. For example, the electronic controller 260 may compare the coupling point (which may be aligned perfectly with an axis of the vehicle 210) to the coupler 230 and determine an angle of the coupler 230 in relation to the axis of the vehicle 210. The determined angle of the coupler 230 in relation to the axis of the vehicle 210 is the trailer start angle.

In some embodiments, the electronic controller 260 is configured to determine a trailer start angle by matching a region of the trailer 205 near to the coupler 230 to a template. For example, the electronic controller 260 may determine from the first data a shape of a region of the trailer 205 (such as a trailer hitch, an adjustment handle, and the like) that is near to the coupler 230. The electronic controller 260 then takes the determined region and matches the region to a template. Once a match between the region and the template is found, the electronic controller 260 determines an absolute trailer angle from the determined region and template.

In some embodiments, once the electronic controller 260 has determined a trailer start angle, the electronic controller identifies the trailer 205 from the second data from the camera 250. For example, the electronic controller 260 may identify from the trailer start angle a region in a field of view of the camera 250 that the trailer 205 is most likely to be in. After identifying the region the trailer 205 is most likely to be in, the electronic controller 260 then identifies the trailer 205. This may be done by matching known trailer shapes to a template, identifying one or more unique shapes of regions of the trailer 205, and the like.

In the example shown, the electronic controller 260 determines a start state of the vehicle 210 (at step 410). The electronic controller 260 may determine that the vehicle 210 is running but not moving, turned off, currently in motion, and the like by utilizing a sensor to determine the start state of the vehicle 210 or by communicating with a different electronic controller controlling an engine of the vehicle 210 or a main controller of the vehicle 210 and receiving the start state from the other controller or main controller. It is useful to know the start state of the vehicle 210 because the start state of the vehicle 210 may affect the determination of the trailer start angle (at step 405) or change a value of the trailer start angle after the trailer start angle has been determined. In some embodiments, if the vehicle 210 is in motion, the electronic controller 260 returns to step 405 to re-determine the trailer start angle.

The electronic controller 260 may further utilize a calibration step to set a zero angle condition. The zero angle condition of the trailer 205 occurs when the angle between the trailer 205 and the vehicle 210 is zero (for example, the trailer 205 is lined up directly behind the vehicle 210). In order to calibrate this condition, an operator of the vehicle 210 must drive forward for a given distance with the wheels 240, 241, 242, and 243 of the vehicle 210 straight in order to straighten out the trailer 205. The electronic controller 260 then determines that the trailer 205 is at the zero angle condition.

When determining the trailer start angle, the electronic controller 260 may also store the image from the first data (used for determining the trailer start angle) and the determined start angle for the particular trailer 205 in the memory 330. When the particular trailer 205 is used again by the vehicle 210, the electronic processor 260 may access the stored image and determine the start angle and compare the image and the determined start angle to a newly received image in order to determine a new start angle of the trailer 205. In some embodiments, the stored image includes a region of the trailer 205 used to determine the trailer start angle. In other embodiments, the stored image is taken at the zero angle condition of the trailer 205. The electronic controller 260 may further update the stored image with a new image of the same trailer 205 when the trailer 205 is attached to the vehicle 210 at a later time.

The electronic controller 260 determines the tracking point 215 of the trailer 205 (at step 415). The camera 250 is positioned to monitor the trailer 205 and send second data to the electronic controller 260, the second data includes the tracking point 215. The electronic controller 260 determines suitable points on the trailer 205 to use as the tracking point 215. The electronic controller 260 may be further configured to identify and discard a potential tracking point 215 based upon suitability of the tracking point 215. For example, by identifying the tracking point 215 as suitable or unsuitable, the electronic controller 260 can select the best tracking point 215 in order to receive an accurate measurement from tracking the tracking point 215 as described below.

In some embodiments, the electronic controller 260 identifies the tracking point 215 based upon the trailer start angle of the trailer 205. For example, the electronic controller 260 may identify a region in a field of view of the camera 250 and identify the trailer 205. After identifying the trailer 205, the electronic controller 260 may then select a number of tracking points based upon features of the trailer 205 that can provide robust tracking point data, such as large, easily identifiable regions, unique features of the trailer 205, features that will stay in focus of the camera 250, and the like. The electronic controller 260 may determine robust tracking points using a Fourier transform to analyze the region and determine the quality of the region as a tracking point.

The second data may be, in some embodiments, video data sent by the camera 250. In these embodiments, the electronic controller 260 tracks the tracking point 215 through the frames of the second data (at step 420). The electronic controller 260 is configured to detect the tracking point 215 in each frame of the second data and determine a change in distance, angle, and other parameters of the tracking point 215 in between each frame. In some embodiments, the electronic controller 260 may determine yaw, pitch, and roll of the trailer 205.

The electronic controller 260 may be further configured to store the determined tracking point 215 (or the plurality of tracking points) in the memory 330 for the particular trailer 205 that is being used. The electronic controller 260 may also access stored tracking points for a specific trailer and use the stored tracking points for the specific trailer every time that the specific trailer is coupled to the vehicle 210.

The electronic controller 260 may make mistakes or miscalculations in tracking the tracking point 215 of the trailer 205 due to environmental conditions. For example, the second data provided by the camera 250 may distort the tracking point 215 due to rain, lighting conditions, shadows, the background, and the like. This may hamper the ability of the electronic controller 260 to accurately determine the angle of the trailer 205 by tracking the tracking point 215.

Therefore, the electronic controller 260 may be configured to filter outliers in the tracking point 215 from the second data (at step 425). For example, if the tracking point 215 is not visible for a portion of the second data provided by the camera 250, the electronic controller 260 may be configured to not utilize the tracking point 215 in determining the angle of the movement path of the trailer 205 as described below. The electronic controller 260, in other embodiments, determines that the tracking point 215 only has one frame or a few frames that are outlier points in the second data, and therefore is configured to only use frames where the tracking point 215 is not an outlier to determine the angle of the movement path of the trailer 205 as described below.

The electronic controller 260 may be configured to utilize the trailer start angle to filter outliers in tracking point 215. For example, the tracking point 215 may be compared against the trailer start angle to determine if the tracking point 215 is within an expected angle of the trailer start angle based upon, for example, an operator of the vehicle 210 moving a steering mechanism of the vehicle 210 in order to change an angle of a movement path of the trailer 205. If the tracking point 215 has moved outside the expected angle, the tracking point 215 may be ignored, recalculated, or the like.

In some embodiments, the electronic controller 260 is configured to determine that the trailer start angle has been changed to an extent that it needs to be recalculated in order to utilize the trailer start angle to filter outliers in the tracking point 215. For example, if an operator of the vehicle 210 stops the vehicle 210, the electronic controller 260 repeats step 405 and determines a new trailer start angle in order to filter outliers in the tracking point 215.

In the example shown, the electronic controller 260 determines a change in the angle of the trailer 205 (at step 430). The electronic controller 260 tracks the tracking point 215 on the trailer 205 using the camera 250. The camera 250 sends the second data containing the tracking point 215 and the electronic controller 260 processes the second data to determine a change in the tracking point 215. A change in the tracking point 215 may be evidenced by detecting a change in angle of the tracking point 215 between frames, a change in distance of the tracking point 215 between frames, and the like. The electronic controller 260 determines the change in the angle of the trailer 205 based on the determined changes in the tracking point 215.

In some embodiments, the electronic controller 260 determines drift of the tracking point 215. Drift of the tracking point 215 may occur by the movement of the vehicle 210 or by the electronic controller 260 incorrectly tracking the tracking point 215. The electronic controller 260 detects drift by, for example, tracking a plurality of tracking points 215 and comparing the change in angle of each tracking point 215. If the change in the angle of one of the tracking points 215 is different than the change in the rest of the tracking points 215, drift of the one tracking point 215 has occurred.

Tracking point drift may also be determined by comparing the change in angle of the tracking point 215 to an expected motion of the trailer 205. The expected motion of the trailer 205 is determined by the electronic controller 260 and may be based on the measured trailer start angle, a speed of the vehicle 210, and a steering motion of the vehicle 210. The electronic controller 260 uses these parameters to determine the expected motion of the trailer 205 and compares where the tracking point 215 should be based upon the expected motion to where the tracking point 215 is in the second data received from the camera 250 in order to determine drift of the tracking point 215.

The electronic controller 260 determines an angle of a movement path of the trailer 205 (at step 435) based upon the trailer start angle and the change in the angle of the trailer 205. For example, the electronic controller 260 determines the trailer start angle and the change in the trailer angle and, using both of these measurements, determines the angle that the trailer 205 is moving at behind the vehicle 210.

In some embodiments, the determination of the angle of the movement path of the trailer 205 further includes using the trailer start angle determined by the electronic controller 260. For example, the electronic controller 260 may determine that the trailer start angle is 15 degrees, and then the electronic controller 260 determines a change in an angle of the tracking point 215 is 5 degrees. For example, the electronic controller 260 determines that the angle of the movement path of the trailer 205 has not only changed 5 degrees from the trailer start angle but also that the angle of the movement path of the trailer 205 is now 20 degrees with respect to a center line of the vehicle 210.

The electronic controller 260 may determine a slow drift of the tracking point 215 by integrating (for example, performing an integral on) the change in the angle of the tracking point 215 (as detected by tracking the tracking point 215) and comparing the integrated change to the trailer angle measurement or another absolute angle measurement of the trailer 205 (for example, one performed after the trailer 205 has been moved by the vehicle 210). A difference between the absolute angle measurement and the integrated change of the trailer angle is indicative of slow drift of the tracking point 215.

The electronic controller 260 outputs the determined angle of the movement path of the trailer 205 (at step 440). The electronic controller 260, in one embodiment, outputs the determined angle to a display in the vehicle 210, which displays the determined angle to an operator of the vehicle 210. In other embodiments, the electronic controller 260 is configured to determine an estimated movement path based upon the determined angle and output the estimated movement path (along with the second data from the camera 250) to the display of the vehicle 210.

In other embodiments, the electronic controller 260 outputs the determined angle via a wireless transceiver of the vehicle 210 to a remote location. This is advantageous if the vehicle 210 is an autonomous vehicle or if the vehicle 210 is being controlled remotely by an operator. The output of the determined angle via the wireless transceiver of the vehicle 210 may happen instead of or in conjunction with outputting the determined angle to a display of the vehicle 210.

Thus, embodiments described herein are generally directed towards a system and methods for determining an angle of a movement path of a trailer.

Various features, advantages, and embodiments are set forth in the following claims.

What is claimed is:

1. A system (200) for determining an angle of a movement path of a trailer (205) attached to a vehicle (210), the system (200) comprising:
    a camera (250); and
    an electronic controller (260) communicatively coupled to the camera (250) and configured to
       receive first data from the camera (250),
       determine an absolute trailer angle of the trailer (205) based on matching one portion of an image received in the first data to a template,
       receive second data from the camera (250),
       estimate a change in the absolute trailer angle of the trailer (205) based on tracking one or more tracking points (215) on the trailer (205) received in the second data,
       determine a drift of the one or more tracking points (215) associated with movement of the vehicle (210), wherein the drift is a difference between a position of the one or more tracking points (215) and an expected position of the one or more tracking points (215) correlated with the movement of the vehicle (210), and
       determine the angle of the movement path of the trailer (205) based on the absolute trailer angle, the drift, and the change in the absolute trailer angle of the trailer (205), wherein the angle of the movement path indicates a direction of movement of the trailer (205).

2. The system (200) of claim 1, wherein the first data includes image data of a coupler (230) of the trailer (205).

3. The system (200) of claim 1, wherein the electronic controller (260) is further configured to determine a start state of the vehicle (210).

4. The system (200) of claim 1, wherein the electronic controller (260) is further configured to utilize a calibration step to set a zero angle condition.

5. The system (200) of claim 4, wherein the zero angle condition occurs when the angle between the trailer (205) and the vehicle (210) is zero.

6. The system (200) of claim 1, wherein the electronic controller (260) is further configured to determine the one or more tracking points (215) on the trailer (205) based on the absolute trailer angle of the trailer (205).

7. The system (200) of claim 1, wherein the electronic controller (260) is further configured to determine the drift of the one or more tracking points (215) based on incorrect tracking of the one or more tracking points (215).

8. The system (200) of claim 7, wherein the electronic controller (260) determines the drift of the one or more tracking points (215) based upon a change in an angle of the one or more tracking points (215) and an expected movement of the trailer (205).

9. The system (200) of claim 7, wherein the electronic controller (260) determines the drift of the one or more tracking points (215) by integrating a change in an angle of the one or more tracking points (215) and comparing the integrated change to the change in the absolute trailer angle of the trailer (205).

10. The system (200) of claim 1, wherein the electronic controller (260) is further configured to output the determined angle of the movement path of the trailer (205) to a display.

11. The system (200) of claim 1, wherein the electronic controller (260) is further configured to output the determined angle of the movement path to a remote location using a transceiver.

12. The system (200) of claim 1, wherein the electronic controller (260) is further configured to determine an estimated movement path the trailer (205) follows based on the determined angle of the movement path.

13. The system of claim 12, wherein the electronic controller (260) is further configured to output the estimated movement path to a display.

14. A method (400) for determining an angle of a movement path of a trailer (205) coupled to a vehicle (210), the method (400) comprising:
    receiving, with an electronic controller (260), first data from a camera (250),
    determining, with the electronic controller (260), an absolute trailer angle of the trailer (205) based on matching one portion of an image received in the first data to a template,
    receiving, with the electronic controller (260), second data from the camera (205),
    estimating, with the electronic controller (260), a change in the absolute trailer angle of the trailer (205) based on tracking one or more tracking points (215) on the trailer (205) received in the second data,
    determining, with the electronic controller (260), a drift of the one or more tracking points (215) associated with movement of the vehicle (210), wherein the drift is a difference between a position of the one or more tracking points (215) and an expected position of the one or more tracking points (215) correlated with the movement of the vehicle (210), and
    determining, with the electronic controller (260), the angle of the movement path of the trailer (205) based on the absolute trailer angle, the drift, and the change in the absolute trailer angle of the trailer (205), wherein the angle of the movement path indicates a direction of movement of the trailer (205).

\* \* \* \* \*